United States Patent [19]

Lee et al.

[11] Patent Number: 5,854,867
[45] Date of Patent: Dec. 29, 1998

[54] OPTICAL MODULE HAVING LENSES ALIGNED ON LENS-POSITIONING V-GROOVE AND FABRICATION METHOD THEREOF

[75] Inventors: Sang-Hwan Lee, Daejeon; Jong-Tae Moon, Seoul; Min-Kyu Song, Daejon; Nam Hwang, Daejeon; Seong-Su Park, Daejeon, all of Rep. of Korea

[73] Assignees: Electronics and Telecommunications Research Institute, Daejeon; Korea Telecom, Seoul, both of Rep. of Korea

[21] Appl. No.: 846,154

[22] Filed: Apr. 25, 1997

[30] Foreign Application Priority Data

Oct. 29, 1996 [KR] Rep. of Korea ............... 96-49493

[51] Int. Cl.$^6$ ..................................................... G02B 6/30
[52] U.S. Cl. ........................... 385/49; 385/88; 385/93
[58] Field of Search .................................. 385/49, 11, 14, 385/15, 51, 52, 88, 92, 93, 94

[56] References Cited

FOREIGN PATENT DOCUMENTS

0642045 A1   3/1995   European Pat. Off. .

OTHER PUBLICATIONS

Nakasuga, Y., et al. Multi–chip hybrid integration on PLC platform using passive alignment technique, 1996 Electronics Components and Technology Conference, pp. 20–25.

Jackson, K. P., et al. A high–density, four–channel, OEIC transceiver module utilizing planar–processed optical waveguides and flip–chip, solder–bump technology, Journal of Lightwave Technology, vol. 12, No. 7, Jul. 1994, pp. 1185–1191.

Schmidt, J. P., et al. Laser–fiber–coupling by means of silicon micro–optical bench and a self–aligned soldering process, SPIE, vol. 2449, pp. 176–183.

Yoshida, J., et al. A compact optical module with a 1.3–$\mu$m/1.5$\mu$m WDM circut for fiber optic subscriber systems, IEICE Trans. Commun., vol. E75–B, No. 9, Sep. 9, 1992, pp. 880–885.

*Primary Examiner*—Phan T. H. Palmer
*Attorney, Agent, or Firm*—Cohen, Pontani, Lieberman & Pavane

[57] ABSTRACT

An improved optical module having lenses aligned on a lens-positioning V-groove and a fabrication method thereof which includes a silicon substrate, which defines a light transfer path below a surface thereof, including light transferring V-grooves and a light receiving V-groove, and lens-positioning V-groove for determining the position of a lens, wherein two lens-positioning V-grooves are formed therein, an optical transmitter module including a laser which is a light source and is flip-chip-bonded to the substrate by a solder bump after an optical waveguide is previously aligned with the V-groove by using an alignment mark behind the vertical portion of the light transferring v-groove. A light transferring lens attached on one lens-positioning V-groove for condensing the light from the laser, and a laser monitoring optical detector arranged on a side wall opposite the laser of the light transferring V-groove, wherein an active region is flip-chip-bonded toward the substrate, for monitoring the laser, and an optical receiver module including a light receiving lens attached on the lens-positioning V-groove of the silicon substrate for condensing beam externally transferred thereto, and a light receiving optical detector attached to the light receiving lens for detecting beam externally transferred thereto, wherein the optical transmitter module and the optical receiver module are arranged in the same silicon substrate.

23 Claims, 6 Drawing Sheets

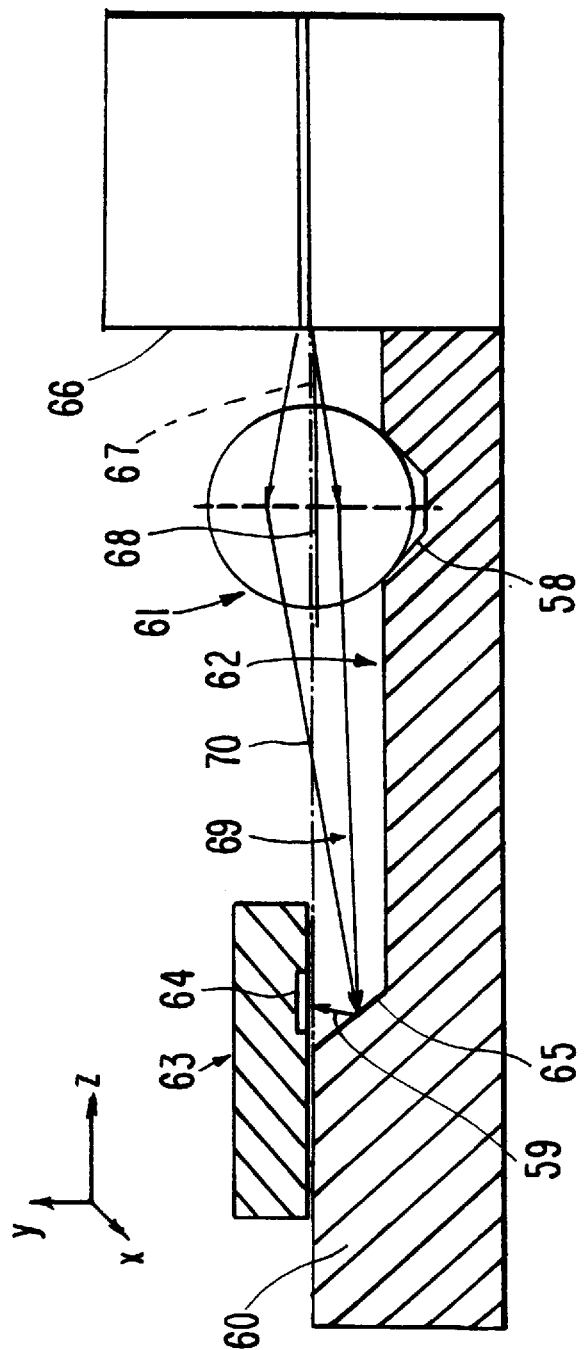
FIG.IC

OPTICAL MODULE HAVING LENSES ALIGNED ON LENS-POSITIONING V-GROOVE AND FABRICATION METHOD THEREOF

BACKGROUND OF THE INVENTION

1. Field of the Invention

The present invention relates to an optical module having lenses aligned on a V-groove and a fabrication method thereof, and particularly, to an improved optical module having lenses aligned on a V-groove and a fabrication method thereof which are capable of aligning an optical device such as an optical detector and lenses on a silicon substrate by a passive alignment method.

2. Description of the Conventional Art

Generally, light used for a high speed and large scale optical communication is transferred through a predetermined medium such as air, glass, dielectric, etc.

It is important to more effectively transfer light to a remote area by the optical communication method. In more detail, in order to transfer the light to a predetermined remote area, the light is transferred through a specific area in which a small amount of light is absorbed. Here, the specific area is called a core in the optical waveguide including an optical fiber.

Namely, light is transferred through a smaller space having a diameter of a few microns of the core of a single mode optical waveguide.

The optical module consists of more than one optical device and optical components. An optical connection for transferring light between different optical devices and optical components.

The optical transmission and optical receiver module are the most basic apparatus for an optical communication system and include various active and passive optical devices such as an optical fiber, an optical waveguide, a laser (Light Amplification by Stimulated Emission of Radiation), an optical detector, a mirror, and lenses. In order to connect the devices and components in the optical module, the most accurate alignment having an accuracy below a few microns is required since the light transfer path is small.

There are two alignment methods of an active method and a passive method in the conventional art.

The active method is directed to searching an optimum optical coupling position between two optical devices in cooperation with a direct measurement of the optical coupling efficiency during the alignment process between the light source and the optical receiver.

In addition, the passive method is directed to previously arranged marks, supports, etc., on an optical substrate such as a silicon wafer for alignment of the optical device by using an accuracy processing technique and the attaching the optical devices on the substrate, for thus achieving an automatic optical coupling thereamong.

The active alignment method has advantages in that this method is implemented by a very accurate mechanical apparatus, the fixing by a laser welding is stable, the optical coupling efficiency is high, and the reliability of the system is better; however, the fabrication cost of the system is expensive.

The passive alignment method has an advantage in that the fabrication cost is not expensive in cooperation with the mass production; however, the optical coupling efficiency is low, and the reliability of the system is not so good.

In the optical alignment method of the conventional passive method, an optical fiver alignment and attaching technique by using a flip chip bonding of an optical device and a V-groove for performing a passive alignment between an optical device such as a laser, etc., and an optical fiber has been widely used in the industry.

The reason for using the V-groove so as to align and attach the optical fiber in the passive alignment method is because it is possible to accurately control the height and position of the optical fiber attached in the V-groove since the width and depth of the V-groove is processed to have a desired accuracy below a micron, which V-groove is formed by an anisotropic etching of a silicon.

In order to passively align the flip chip-bonded optical device and the optical fiber arranged in the V-groove, these elements must be arranged during a process of forming the V-groove and fabricating the flip-chip bonding pad, and in addition, the alignment must be accurately arranged during the bonding process of the optical devices.

The accuracy of the passive alignment method is about 2~3 $\mu$m.

Since the light radiated from a component having a smaller diameter such as a laser, an optical fiber, etc., has a radiating characteristic itself, lenses, and the like is necessary for effectively condensing the light.

However, since the alignment accuracy which is required for the optical coupling is degraded to below 1~2 $\mu$m when the lenses and tapered optical fiber are used, it is impossible to adapt the conventional passive optical coupling method.

Therefore, in the conventional passive alignment method, a butt optical coupling technique is used. Here, a possible optical coupling efficiency is a few percentage (%).

In addition, in order to attach the lenses on the silicon substrate, since the optical axis must be formed at a position higher as much as the radius of the lenses, the optical device such as laser must be arranged at a position higher as much as the radius of the lenses from the surface.

In order to attach the optical device in the above-described manner, an additional support is placed below the optical device, and then the optical device is attached thereto. In this case, the alignment process is necessary for two portions such as the substrate surface and the support, for thus degrading the alignment accuracy, so that it is impossible to obtain a desired optical coupling efficiency.

In addition, differently from the laser which emits light from an edge portion of the device, so as to integrate an optical detector device such as a photodiode in which an active region exists on the surface of the device with respect to the substrate surface, the optical detector is vertically arranged with respect to the substrate or is attached askew with respect to the surface of the substrate. In addition, since the optical detector has a thin thickness of about 100 microns, it is impossible to attach the optical detector itself to the substrate or to arranged askew with respect to the substrate, for thus requiring an additional auxiliary support. In this method, there is a disadvantage in that the accuracy of the alignment is degraded compared to the flip chip bonding method which is directed to directly attaching and aligning the device to the substrate. In addition, since a process of double-bonding the support and the substrate is needed, the fabrication cost of the system is increased.

SUMMARY OF THE INVENTION

Accordingly, it is an object of the present invention to provide an improved optical module having lenses aligned on a lens-positioning V-groove and a fabrication method thereof which overcome the problems encountered in the conventional art.

It is another object of the present invention to provide an improved optical module having lenses aligned on a lens-positioning V-groove and a fabrication method thereof by which it is possible to fabricate the compact system by using a silicon wafer with respect to the package of the optical device, for thus decreasing the fabrication cost.

It is still another object of the present invention to provide an improved optical module having lenses aligned on a lens-positioning V-groove and a fabrication method thereof by which it is possible to use the automatic alignment function based on a flip chip bonding by forming a V-groove on the silicon substrate, attaching lenses on the V-groove, and directly attaching the laser to the surface of the substrate by positioning an optical axis to a periphery of the surface of the substrate.

It is still another object of the present invention to provide an improved optical module having lenses aligned on a lens-positioning V-groove and a fabrication method thereof which is capable of obtaining a high optical coupling characteristic by using an alignment of a passive method and lenses.

It is still another object of the present invention to provide an improved optical module having lenses aligned on a lens-positioning V-groove and a fabrication method thereof which makes it possible to obtain an accurate passive alignment with respect to a flip chip-bonded optical device in the vertical direction with respect to the height of the lenses and the V-groove by attaching the lenses on the V-groove formed through an anisotropic silicon etching process.

It is still another object of the present invention to provide an improved optical module having lenses aligned on a lens-positioning V-groove and a fabrication method thereof which is able to prevent the optical coupling efficiency from being decreased by properly controlling the distance between the substrate and the optical waveguide even when a focal position of light passed through the lenses is different due to the distance difference between the lenses and the optical device.

It is still another object of the present invention to provide an improved optical module having lenses aligned on a lens-positioning V-groove and a fabrication method thereof which is capable of fabricating a compact-sized array type coupling apparatus at lower cost, which has more than one optical device and lenses since it is possible to align the same on the identical substrate by using the silicon substrate and semiconductor fabrication process for forming the V-groove and fabricating the optical device attaching bumper.

It is still another object of the present invention to provide an improved optical module having lenses aligned on a lens-positioning V-groove and a fabrication method thereof which is capable of optically coupling a lateral emitting laser and a surface light receiving optical detector device with respect to a parallel beam in the identical substrate by controlling the width of the lenses attaching V-groove.

It is still another object of the present invention to provide an improved optical module having lenses aligned on a lens-positioning V-groove and a fabrication method thereof which is capable of concurrently fabricating a pair of light transmitting and receiving optical coupling apparatuses of a light source and light receiving device in the identical substrate, and fabricating the array apparatus thereof.

To achieve the above objects, there is provided an improved optical module having lenses aligned on a V-groove which includes a silicon substrate, which defines a light transfer path below a surface thereof, including light transferring V-grooves and a light receiving V-groove for determining the position of a lens, wherein two light transferring V-grooves are formed therein, an optical transmitter module including a laser which is a light source and is flip-chip-bonded to the substrate by a solder bump after an optical waveguide is previously aligned with the V-groove by using an alignment mark behind the vertical portion of the light transferring V-groove in which a lens is arranged, a light transferring lens attached on one light transferring V-groove for condensing the light from the laser, and a laser monitoring optical detector arranged on a side wall opposite the laser of the light transferring V-groove, wherein an active region is flip-chip-bonded toward the substrate, for monitoring the laser, and an optical receiver module including a light receiving lens attached on the light receiving V-groove of the silicon substrate for condensing beam externally transferred thereto, and a light receiving optical detector attached to the light receiving lens for detecting beam externally transferred thereto, wherein the optical transmitter module and the optical receiver module are arranged in the same silicon substrate.

To achieve the above objects, there is provided an improved optical module fabrication method having lenses aligned on a lens-positioning V-groove which includes the steps of a first step for aligning on a silicon substrate having a light transferring/receiving V-groove and for flip-chip-bonding a laser on the silicon substrate by using a solder reflow process, a second step for aligning on the silicon substrate and for flip-chip-bonding a laser monitoring optical detector and a light receiving optical detector by using a solder melted, and a third for applying an adhesive to a portion of each V-groove and for bonding the light transferring/receiving lens thereon by using ultra violet ray or by heating.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1C is a cross-sectional view taken along line Ic—Ic' of FIG. 1A according to the present invention;

DETAILED DESCRIPTION OF THE INVENTION

Figure 1A:
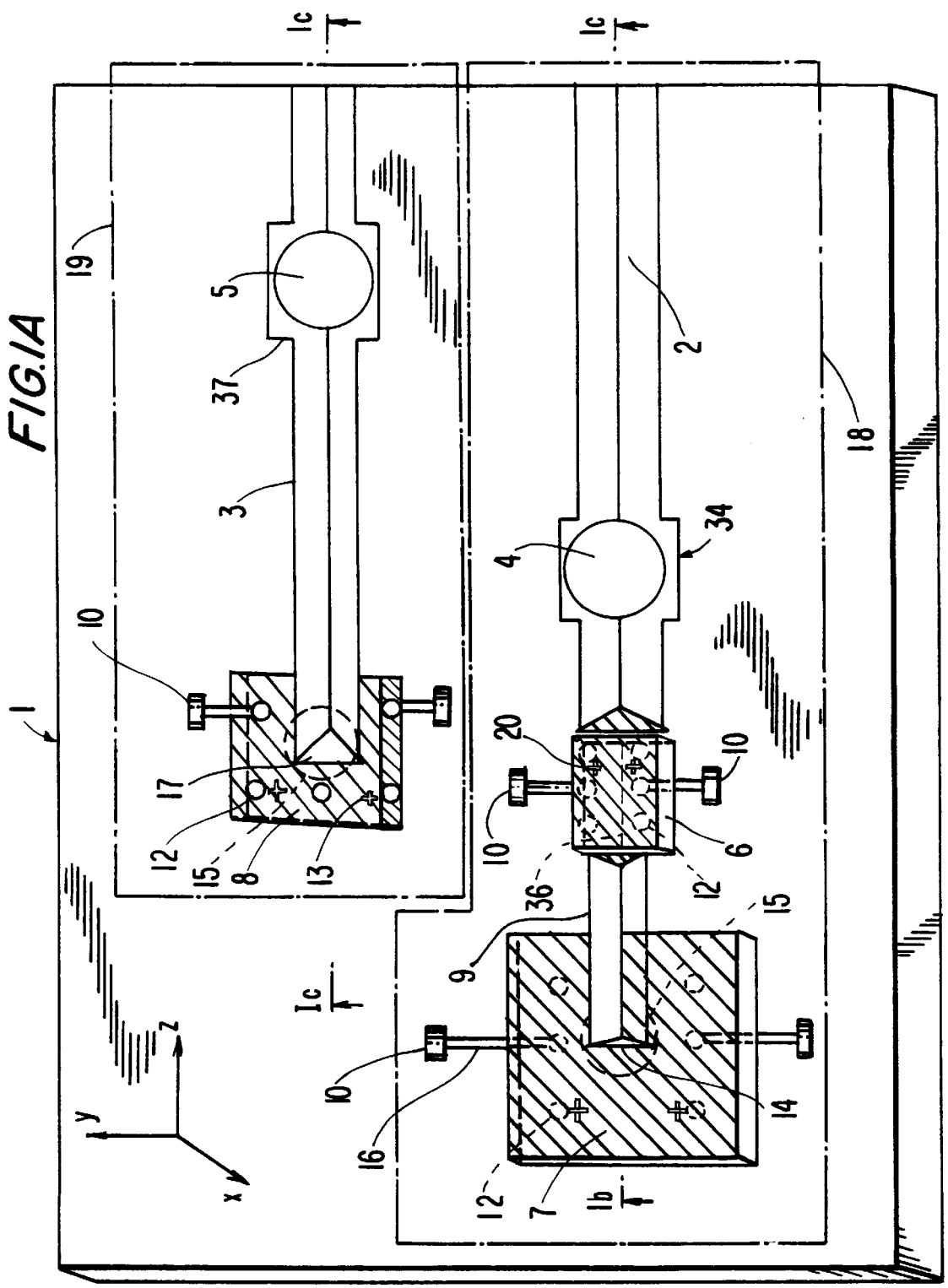
FIG. 1A is a perspective view illustrating an optical module having a V-groove, lenses aligned on the lens-positioning V-groove, and optical devices having flip chip bonded according to the present invention.

The optical module having lenses aligned on a lens-positioning V-groove and a fabrication method thereof according to the present invention includes an optical fiber or a passive and active optical waveguide apparatus. In addition, an optical coupling apparatus between a light source such as a laser and a light emitting diode, and an optical detector such as a photodiode or a pair of a light emitting and receiving device includes a surface-mounted optical device, a V-groove for transferring a light and attaching a light condensing lens thereon, and a silicon substrate including the lenses attached on the V-groove. The optical device includes a light source such as a laser or a light emitting diode, or a light receiving device such as a photodiode, or a pair of a light source or a light receiving device, and an array consisting of a pair of light sources, and light receiving devices.

The surface mounting of the optical device is performed through a solder bonding, a resin bonding, or a flip chip bonding.

In the case that the optical device is a laser diode or a light emitting diode, the light radiated from a facet of the laser is transferred to the lenses through air above the V-groove and inside of the V-groove, and then the light is condensed. Thereafter, the light is transferred to the optical fiber or the optical waveguide arranged in the end portion of the V-groove of the substrate.

In the case that the optical device is a light receiving device such as an optical detector, the light radiated from the optical fiber or the optical waveguide is transferred over the V-groove and the substrate and to the lenses arranged in the lens-positioning V-groove. Thereafter, the light is condensed and scanned to the lateral wall of the V-groove, and then is made incident on the active region of the optical device, which is surface-mounted, in cooperation with the reflection surface of the lateral wall.

The surface mounting of the optical device must have an automatic alignment function so that the optical device, the V-groove, and the lenses arranged in the lens-positioning V-groove can passively integrate.

For the automatic alignment function, the flip chip solder bonding is preferably better. The silicon substrate includes a solder bump for the flip chip bonding so that the attachment of the optical device, an alignment, and an electrical connection with the optical device can be obtained.

The solder bump is automatically aligned with respect to the V-groove by using a self-aligning method of the semiconductor fabrication process.

In addition, the lenses attached on the V-groove is easily aligned with the optical device with respect to the height and left and right horizontal position in cooperation with a width control characteristic below micron unit which the semiconductor fabrication process and silicon anisotropic etching, and the distance from the optical device is determined by forming a well type V-groove.

The V-groove is formed from the substrate to the opposite portion of the optical device. The distance thereof is determined based on the ratio between the focal distance of the lenses and the beam condensed.

The optical device includes a metallic pad or a solder bump opposite the bump of the substrate, so that the optical device is bonded with the solder bump on the substrate.

The optical module having lenses aligned on a lens-positioning V-groove and a fabrication method thereof according to the present invention will now be explained in more detail.

FIG. 1A is a perspective view illustrating an optical module having a V-groove, lenses aligned on the lens-positioning V-groove, and optical devices having bonded flip chips according to the present invention.

As shown therein, there are provided a silicon substrate 1, light transferring/receiving V-grooves 2 and 3 and lens-positioning V-groove 34 formed in the substrate 1, light transferring/receiving lenses 4 and 5 attached on the lens-positioning V-groove 34 and 37, a laser 6, a laser monitor optical detector 7, and a light receiving optical detector 8.

An optical transmitter module 18 includes a laser 6 which is a light source, a light transferring lens 4 for condensing light, first and second light transferring V-grooves 2 and 9 for providing a light transferring path for light passed below the surface of the substrate, light transferring lens-positioning V-groove 34 determines the position of the lens 4, and an optical detector 7 arranged for the laser 6.

The optical waveguide 36 of laser 6 is previously aligned with the first light transferring V-groove 2 and lens-positioning V-groove 34 by using the alignment mark 20, and the laser 6 is flip-chip-bonded to the substrate 1 in cooperation with the solder bump 12.

The optical detector 7 for monitoring the laser 6 is flip-chip-bonded on the lateral wall 14 opposite the laser 6 of the second receiving V-groove 9 in the reverse side of the laser 6, namely, in the portion where the light transferring lens 4 does not exist in order for the active region 15 to be arranged toward the substrate.

Figure 1B:
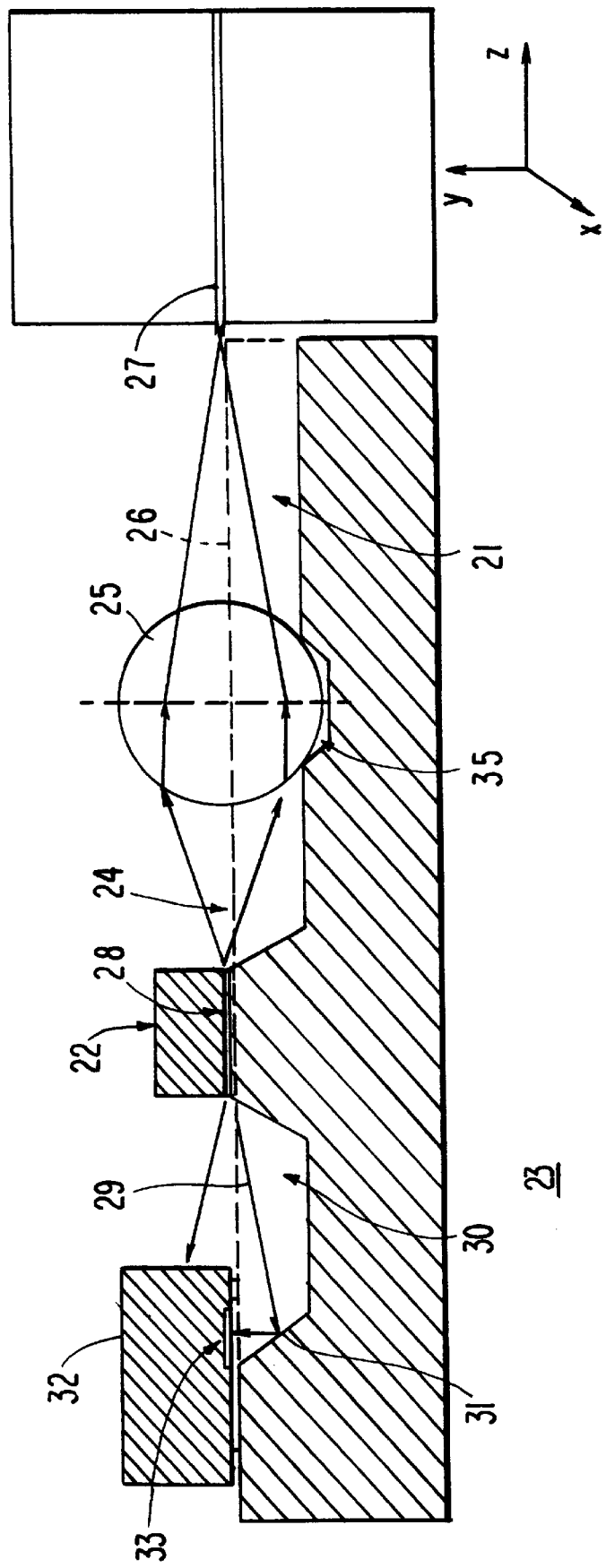
FIG. 1B is a cross-sectional view taken along line Ib—Ib' of FIG. 1A according to the present invention.

FIG. 1B is a cross-sectional view taken along line Ib—Ib' of FIG. 1A according to the present invention.

One side of the first light transferring V-groove 21 is extended to the end of the substrate 23, and another side thereof is extended to the laser 22. The first light transferring V-groove 21 serves to transfer the beam 24 from the laser 22 to a periphery of the light transferring lens 25 attached to the first light transferring V-groove through a lower portion of the surface 26 of the silicon substrate. And the deep lens-positioning V-groove 35 align the laser 22 and the light transferring lens 25 with respect to X, Y, and Z directions.

Namely, the horizontal position of the light transferring lens 25 attached to the deep lens-positioning V-groove 35 and the height of the center portion of the lens 25 from the surface of the silicon substrate are determined, respectively, by the position and width of the V-groove 21.

The length of the first light transferring V-groove 21 is determined by the optical path including the light transferring lens 25 and the selection of the magnification ratio by the lens 25.

The beam 24 from the optical waveguide 28 of the laser 22 is transferred to the lens through the channel formed by the first light transferring V-groove 21 and the upper portion of the substrate, and then condensed, and made incident on the optical fiber or the core 27 of the optical waveguide at the end portion of the substrate.

The beam 29 radiated from the rear side of the laser 22 is reflected by the side wall 31 of the second light transferring V-groove 30 of the rear portion of the laser 22, and is transferred to the active region 33 of the optical detector 32.

In addition, the optical receiver module 19 receives light transferred from the external optical module. As shown in FIG. 1A, the optical receiver module 19 includes a receiving V-groove 3, lens-positioning V-groove 37, a receiving lens 5 arranged therein, and an optical detector 8.

The optical detector 8 is attached on the side wall 17 of the receiving V-groove 3 toward the receiving region 15 of optical detector 8. The alignment among the optical detector 8, the receiving V-groove 3, lens-positioning V-groove 37 and the receiving lens 5 arranged in the lens-positioning V-groove 37 is performed in cooperation with the flip chip bonding by using the previous alignment method and the solder bump 12.

FIG. 1C is a cross-sectional view taken along line Ic—Ic' of FIG. 1A according to the present invention.

The beam 67 radiated from the optical fiber or the core 66 of the optical waveguide device is made incident on a portion higher than the center line 68 of the receiving lens 61. Therefore, the beam 69 from the lens 61 is bent down toward the surface 70 of the substrate 60, and is focused on the side wall 65 of the receiving V-groove 62 having a surface inclined at an angle of 54.7°.

The beam 59 reflected by the side wall 65 of the V-groove is made incident on the receiving portion 64 of the optical detector 63.

The horizontal position and the height of the center position of the lens 61 attached to the deep lens-positioning V-groove 58 are determined, respectively, by the position and width of the V-groove 58.

As shown in FIG. 1A, on the substrate 1, there may be arranged a connection wire 16 and a wire bonding pad 10 for electrically connecting the bump 12 and the optical device for flip-chip-bonding the optical device.

The optical transmitter module 18 and the optical receiver module 19 may be separately formed on different substrate, and in addition, a pair of the optical transmitter and receiver module and an array of the optical transmitter and receiver module may be formed on the same substrate.

Next, FIGS. 2A through 2D are cross-sectional views illustrating a silicon substrate so as to explain the fabrication method of the silicon substrate according to the present invention.

Figure 2A:
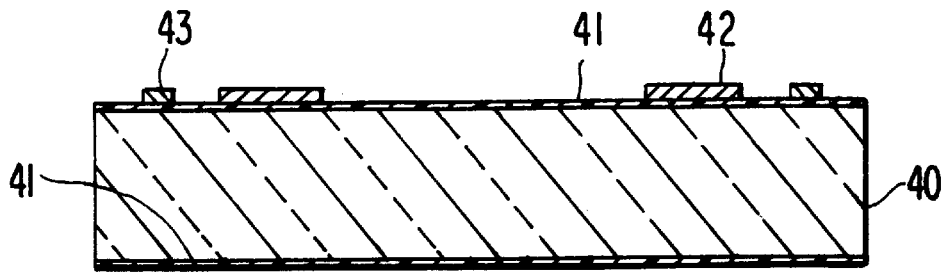
FIGS. 2A through 2D are cross-sectional views illustrating a silicon substrate so as to explain the fabrication method of the silicon substrate according to the present invention.

As shown in FIG. 2A, a first insulation film 41 such as a silicon nitride layer or a silicon oxide layer or a double layer of them is formed on front and reverse sides of the silicon substrate 40. Metallic pads 42 and alignment mark pads 43 are formed on the first insulation film 41 by a photolithography and a lift-off process.

The metallic pad 42 and the alignment mark pad 43 are formed in a multiple layer. For the lowest metallic layer directly contacting with the first insulation film 41, Cr or Ti is used. For the following metallic layer, Ni or Cu is used. In addition, for the following layer, Pt is used, and for the outermost layer, Au is used.

Figure 2B:
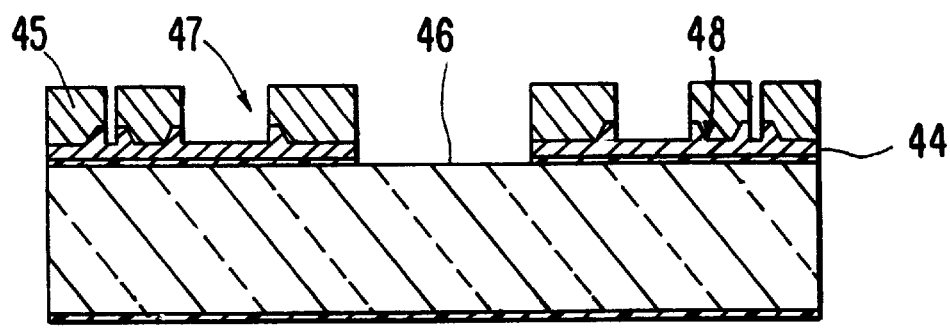

Next, as shown in FIG. 2B, a second insulation film 44 of a silicon nitride film or a silicon oxide film is deposited on the top surface of the substrate 40. Thereafter, a photoresist 45 is coated thereon. In addition, a solder dam 47 having a surface smaller than the metallic pad 42 is formed on a predetermined portion of the metallic pad 42 by dry-etching the first insulation film 41 and the second insulation film 44, and an alignment mark 48 having a width narrower than the alignment mark pad 43 is formed on a predetermined portion of the alignment mark pad 43, and a lens-positioning V-groove etching window 46 is formed thereon, and the photoresist 45 is removed.

Here, when forming the V-groove etching window 46 by etching the first insulation film 41 and the second insulation film 44, a portion of the second insulation film 44 on the metallic pad 42 is etched so as to form a solder dam 47.

In addition, as shown in FIG. 2B, the second insulation film 44 deposited on the alignment mark pad 43 is etched at the time when the V-groove etching window is formed so as to form the alignment mark 48, so that it is possible to remove a photolithography error between the alignment mark 48 and the lens-positioning V-groove etching window 46.

Figure 2C:
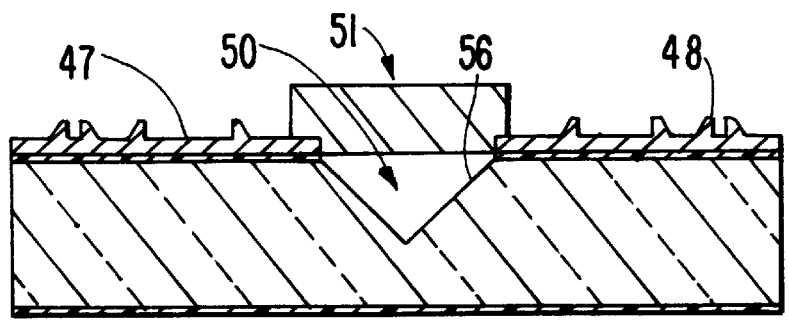

As shown in FIG. 2C, a laser support 51 is formed in a behind of the V-groove etching window 46 where a laser 6 is attached by the photolithography and an Au coating process. A lens positioning and a light transferring/receiving V-groove 50 is formed on the silicon substrate through the V-groove etching window 46 by using a silicon anisotropic etching solution.

Figure 2D:
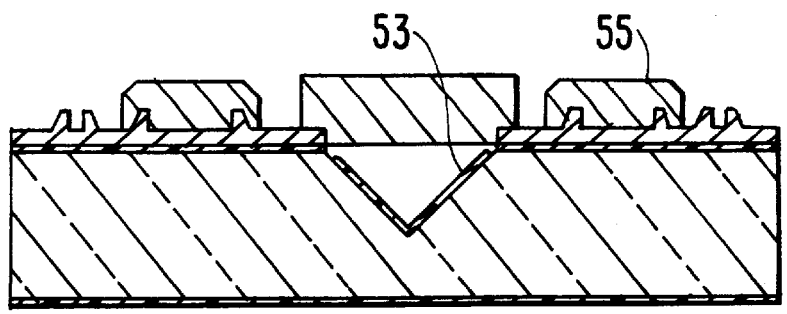

Next, as shown in FIG. 2D, a solder bump 55 is formed on the solder dam 47 by the photolithography, the solder material deposition process, and the lift-off process. The solder bump 55 may be formed by an electrical plating method.

In addition, the metallic reflection film 53 may be formed on the V-groove side wall 56 so as to increase the reflection characteristic of the side wall 56 of the V-groove 50.

Figure 3:
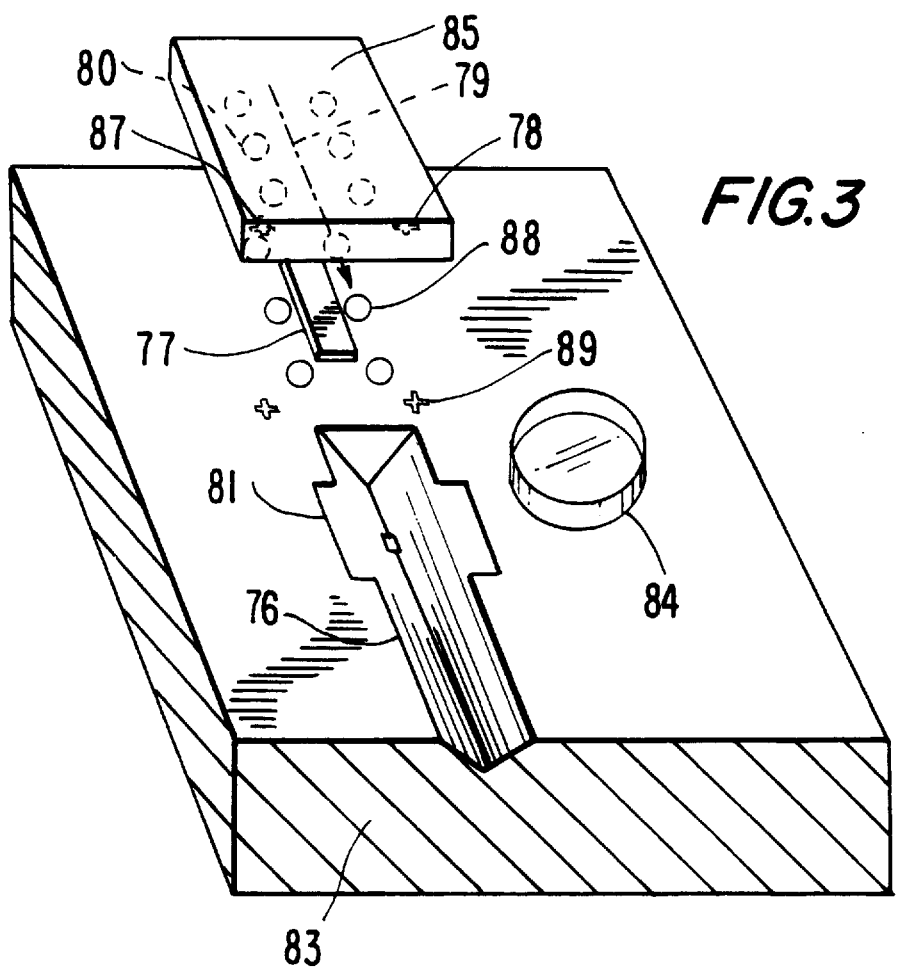
FIG. 3 is a perspective view illustrating a substrate, lenses and an optical device so as to explain the method for mounting the lenses and the optical device on the substrate which is fabricated in the method as shown in FIGS. 2A through 2D according to the present invention.

With reference to FIG. 3, the processes of assembling of the optical module by using the silicon substrate will now be explained.

In order to align the V-groove 81 of the silicon substrate 83, the lens 84, and the laser chip 85, the alignment mark 78 formed on the surface of the laser is aligned with respect to the alignment mark 89 in order for the direction of the optical waveguide 79 to be in the lengthwise direction of the V-groove 76, and the substrate 83 or the laser chip 85 is heated, for thus bonding to the silicon substrate 83 in cooperation with the melted solder.

Here, the height of the laser chip bonded is determined based on the height of the laser support 77 formed on the substrate 83.

The laser monitoring optical detector 7 and the light receiving detector 8 are flip-chip-bonded in the same manner. In order to align and attach the lens 83 on/to the V-groove 81, a preselected adhesive is applied to the attaching portion of the V-groove 81, and then the lens 84 is placed thereon, and the portion on which the lens 84 is placed is heated.

In addition, the lens 84 may be attached on a lens-fixing auxiliary substrate, and may be attached on the lens-attaching V-groove of the silicon substrate.

The center of the lens coincides with the surface of the silicon substrate so that the beam from the lens is scanned on the side wall of the V-groove, and is reflected by the light receiving portion of the optical detector.

Figure 4:
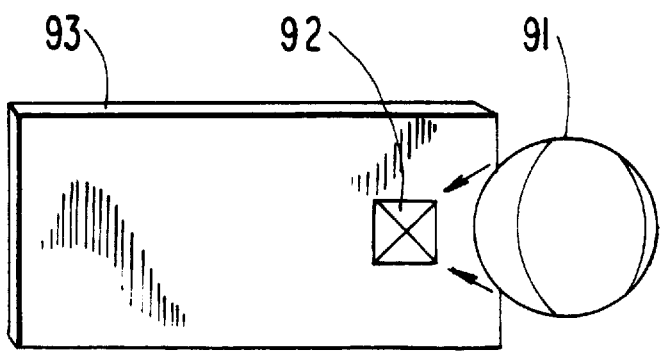
FIG. 4 is a perspective view illustrating lenses auxiliary apparatus according to the present invention.

In addition, when the diameter of the lens attached on the V-groove is very small, an auxiliary device as shown in FIG. 4 may be used. This device is directed to forming a groove 92 having a diameter smaller than the lens 91 on the silicon substrate 93, attaching the lens 91 on the groove 92, reversing the groove 92 in order for the lens 91 to be arranged toward the V-groove 81, and concurrently attaching the lens 91 and the silicon substrate to a portion of the V-groove 81.

With the above-described process, it is possible to more easily and stably attach the lens on the silicon substrate 83.

In addition, the horizontal distance of the lens center is formed in an integer number of times of the distance of two cores.

The silicon substrate 1 on which the optical device and lens are attached is used as an optical module. The light transferring and/or receiving optical module is fabricated by integrating the active and passive optical waveguide device or optical fiber.

Figure 5:
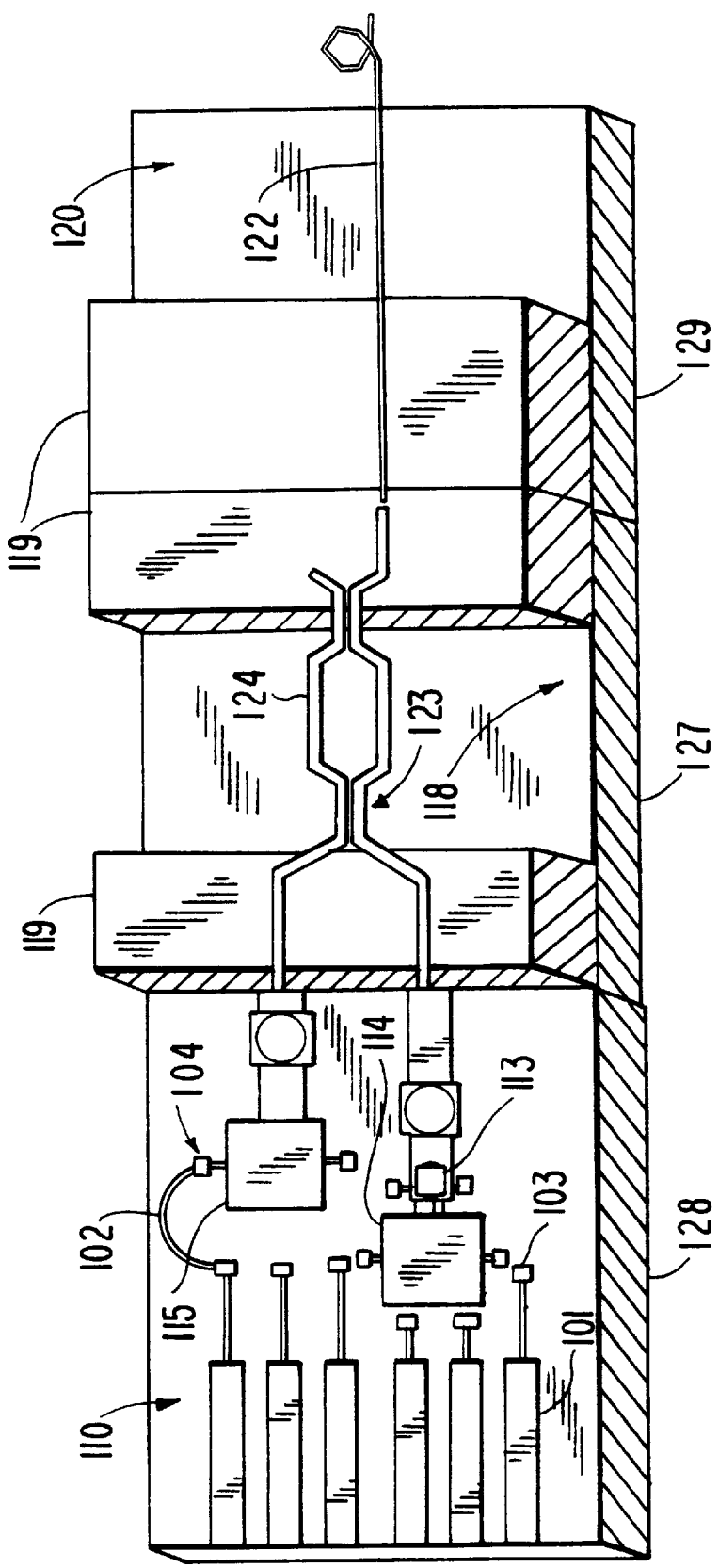
FIG. 5 is a perspective view illustrating an optical assembly having an optical module, an optical waveguide device, and an optical fiber therein according to the present invention.

FIG. 5 is a perspective view illustrating an optical assembly having an optical module 128, an optical waveguide module 127, and an optical fiber module 129 therein according to the present invention.

Namely, FIG. 5 illustrates an optical module 128 which is made by a laser 113, an optical detector 114 for monitoring the laser 113 and an optical detector 115.

Laser, laser monitoring detector and optical detector are wire-bonded through wire bonding pad (103,104) on the surface of the silicon substrate 110.

The wavelength division multiplexing module 127 includes a Mach-Zehnder device 124 formed on the silicon substrate 118, a 3 dB coupler 123, and an optical filter. There is further provided a cover 119 for preventing a polishing of the substrate surface and protecting the optical waveguide.

The optical fiber module 129 includes the cover 119 for protecting the optical fiber 122 attached on the substrate 120. After the WDM module 127 and the optical fiber block 129 are aligned and attached by the active or passive alignment method, the optical module 128 and the WDM module 127 are fixed to a multiple axis stage, respectively, and an electrical signal is applied to optical devices through the metal pad 101 which is wire-bonded to the devices on the optical module 128, namely, the laser 113, the laser monitoring optical detector 114, and the receiving optical detector 115. Thereafter, a position where is capable of obtaining the maximum optical coupling efficiency is monitored by the active method which is directed to monitoring the optical coupling efficiency between the optical module 128 and the optical fiber 122, and then two modules are fixed by a preselected adhesive.

As described above, the optical module having lenses aligned on a lens-positioning V-groove and a fabrication method thereof according to the present invention is directed to fabricating a compact-sized package compared to the optical module of the active alignment method. In addition, this method achieves mass production, and reduce the fabrication cost by using the semiconductor fabrication process technique. Moreover, by using the passive alignment and lens, it is possible to improve the optical coupling efficiency which was a disadvantage of the passive alignment method. In addition, it is possible to more easily integrate the array-type optical module having a laser, an optical detector device, a V-groove, and lenses on one substrate.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An optical module having lenses aligned on a V-groove, comprising:

a substrate having a top and a bottom surface, said substrate having formed therein first and second optical transferring V-grooves and an optical receiving V-groove, said grooves defining a light transferring path and defining the position for at least one lens disposed in said light transferring path;

an optical transferring module disposed on the top surface of the substrate and including a laser flip-chip-bonded to the substrate, an optical transferring lens attached at the first optical transferring V-groove for condensing light from the laser, and a laser monitoring optical detector flip-chip-bonded to the substrate and disposed proximate an edge of a side wall of the second optical transferring V-groove and opposite the laser such that an active region of the laser monitoring optical detector is disposed over the second optical transferring V-groove for detecting light from the laser reflecting off the side wall of the second optical transferring V-groove so as to monitor the laser; and an optical receiving module disposed on the top surface of the substrate and including an optical receiving lens attached at the optical receiving V-groove of the substrate for condensing light externally transferred thereto, and a light receiving optical detector flip-chip-bonded to the substrate and disposed proximate an edge of a side wall of the light receiving V-groove so that an active region of the light receiving optical detector is disposed over the side wall of the light receiving V-groove for detecting the condensed light reflecting off the side wall of the light receiving V-groove from the optical receiving lens.

2. The optical module of claim 1, wherein at least one pair of optical transmitter module and optical receiver module is arranged on the same substrate in parallel in an array form.

3. The optical module of claim 1, wherein said optical module is integrated with a wavelength division multiplexing device.

4. The optical module of claim 1, wherein said optical module is integrated with an optical fiber.

5. The optical module of claim 1, wherein the horizontal distance between two lenses is an integer number of times with respect to the distance between neighboring array type optical fibers.

6. The optical module of claim 1, wherein said silicon substrate includes:

a solder bump for bonding a laser monitoring optical detector, a light receiving optical detector, and lasers;

a connection wire and a wire bonding pad for electrically connecting with external components.

7. The optical module of claim 1, wherein said substrate includes:

a first insulation film formed on the top and bottom surfaces of the substrate;

multiple metallic pads and alignment mark pads formed on the first insulation film;

a second insulation film formed on the to surface of the substrate;

a V-groove etching window and a solder dam formed by etching the first insulation film and the second insulation film;

a laser support formed on the metallic pad;

a V-groove formed in the substrate through the V-groove etching window;

a solder bump formed on the metallic pad and the second insulation film; and a metallic reflective film formed on the side wall of the V-groove.

8. The optical module of claim 1, wherein the substrate is a silicon substrate.

9. A method for fabricating an optical module comprising the steps of:

provisioning a substrate;

forming a first insulation film on a top and a bottom surface of the substrate;

forming a metallic pad and an alignment mark pad on the first insulation film by a photolithography and a lift-off process;

depositing a second insulation film and a photoresist on the metallic pad and the alignment mark pad by a photolithography process;

dry-etching the first and second insulation films so as to form a solder dam having a smaller surface area than that of the metallic pad on a portion of the metallic pad, an alignment mark having a width narrower than that of the alignment mark pad on a portion of the alignment mark pad, and a V-groove etching window so as to minimize photolithographic errors in making the alignment mark and the V-groove etching window;

forming a laser support on a portion of the V-groove etching window, and forming a lens-positioning V-groove on the substrate by etching through the V-groove etching window using an anisotropic etching solution; and depositing a solder material on the solder dam by the photolithography and forming a solder bump by a deposition and lift-off method.

10. The fabrication method of claim 9, wherein said silicon substrate has a (100) crystalline direction.

11. The fabrication method of claim 9, wherein said first insulation film is formed of one selected from the group comprising a silicon oxide film and a silicon nitride film.

12. The fabrication method of claim 9, wherein said first insulation film is formed in a multiple layer of a silicon oxide film and a silicon nitride film.

13. The fabrication method of claim 9, wherein said second insulation film is formed of one of a silicon oxide film and a silicon nitride film.

14. The fabrication method of claim 9, wherein each of said metallic pad and said alignment mark pad includes a layer comprising one of Cr and Ti, a layer comprising one of Ni and Cu, a layer of Pt, and a layer of Au.

15. The fabrication method of claim 9, wherein an etching pattern of said solder dam is self-aligned on the mask such as a lens-positioning V-groove etching window so that a photolithography error between the solder dam and the etching pattern of the V-groove etching window can be automatically removed.

16. The fabrication method of claim 9, wherein a metallic reflection film is deposited on a side wall of the V-groove so as to reflect light.

17. The fabrication method of claim 9, wherein the height from the substrate of the laser is determined by controlling the thickness of the laser support.

18. The fabrication method of claim 9, wherein a V-groove is formed in a reverse side of the laser, and the light radiated from the reverse side of the laser is made incident on the light receiving optical detector by reflecting off the side wall of the V-groove.

19. The fabrication method of claim 9, wherein when flip-chip-bonding the laser and the light receiving optical detector to the substrate, an alignment mark is formed on a portion of the top surface of the substrate, the laser and light receiving optical detector so that a pre-alignment is performed.

20. The fabrication method of claim 9, wherein said V-groove of the second insulation film deposited on the alignment mark pad at the time when forming a V-groove etching window is etched to form an alignment mark, so as to remove a photolithography error between the alignment mark and the lens-positioning V-groove etching window.

21. The fabrication method of claim 9, wherein the center of the lens is positioned top surface of the substrate so that the beam from the lens is scanned to the lateral wall of the V-groove and is reflected to the optical detector.

22. The method of claim 9, further comprising the steps of:

aligning and flip-chip-bonding a laser on the substrate using a solder reflow process;

aligning and flip-chip-bonding a laser monitoring optical detector and a light receiving optical detector on the substrate using a solder reflow process;

applying an adhesive to a portion of one of the V-grooves for bonding a lens; and curing the adhesive using one of ultra-violet ray and heating.

23. The method of claim 9, wherein the substrate is a silicon substrate and the anisotropic etching solution is a silicon anisotropic etching solution.

* * * * *